United States Patent [19]

Ohyama et al.

[11] Patent Number: 5,342,974
[45] Date of Patent: Aug. 30, 1994

[54] HALOGENATED ANTHRAQUINONE AND THEIR USE AS NEAR INFRARED RAYS ABSORBING OPTICAL FILTERS

[75] Inventors: Tsukasa Ohyama; Shizuo Kuroda; Keisuke Takuma; Hiroshi Aiga, all of Fukuoka, Japan

[73] Assignee: Mitsui Toatsu Chemicals, Incorporated, Tokyo, Japan

[21] Appl. No.: 291,028

[22] Filed: Dec. 28, 1988

[30] Foreign Application Priority Data

Dec. 28, 1987 [JP] Japan .................. 62-330163

[51] Int. Cl.$^5$ .................................. C07C 50/20
[52] U.S. Cl. ............................... 552/259; 552/258
[58] Field of Search ........... 260/378, 381; 552/258, 552/259

[56] References Cited

U.S. PATENT DOCUMENTS

| | | | |
|---|---|---|---|
| 4,446,047 | 5/1984 | Thompson | 260/381 |
| 4,455,253 | 6/1984 | Thompson | 260/381 |
| 4,585,574 | 4/1986 | Blunck et al. | 260/381 |
| 4,755,012 | 7/1988 | Kojima | 260/378 |

OTHER PUBLICATIONS

Lubs, The Chemistry of Synthetic Dyes and Pigments, 1955, pp. 670-671, 404-405.

*Primary Examiner*—C. Warren Ivy
*Assistant Examiner*—Raymond Covington
*Attorney, Agent, or Firm*—Millen, White, Zelano & Branigan

[57] ABSTRACT

High-purity 1,4,5,8-tetraanilidoanthraquinones which are substituted at the p-position of at least one of four anilido benzene rings by a halogen atom are good near infrared rays absorbing filters and at prepared from high purity 1,4,5,8-tetrachloroanthraquinone by reaction with a correspondingly substituted aniline or mixture of anilines in the presence of a salt of an aliphatic carboxylic acid,. a benzyl alcohol derivative and copper ions as reaction catalyst.

12 Claims, 1 Drawing Sheet

F I G. 1
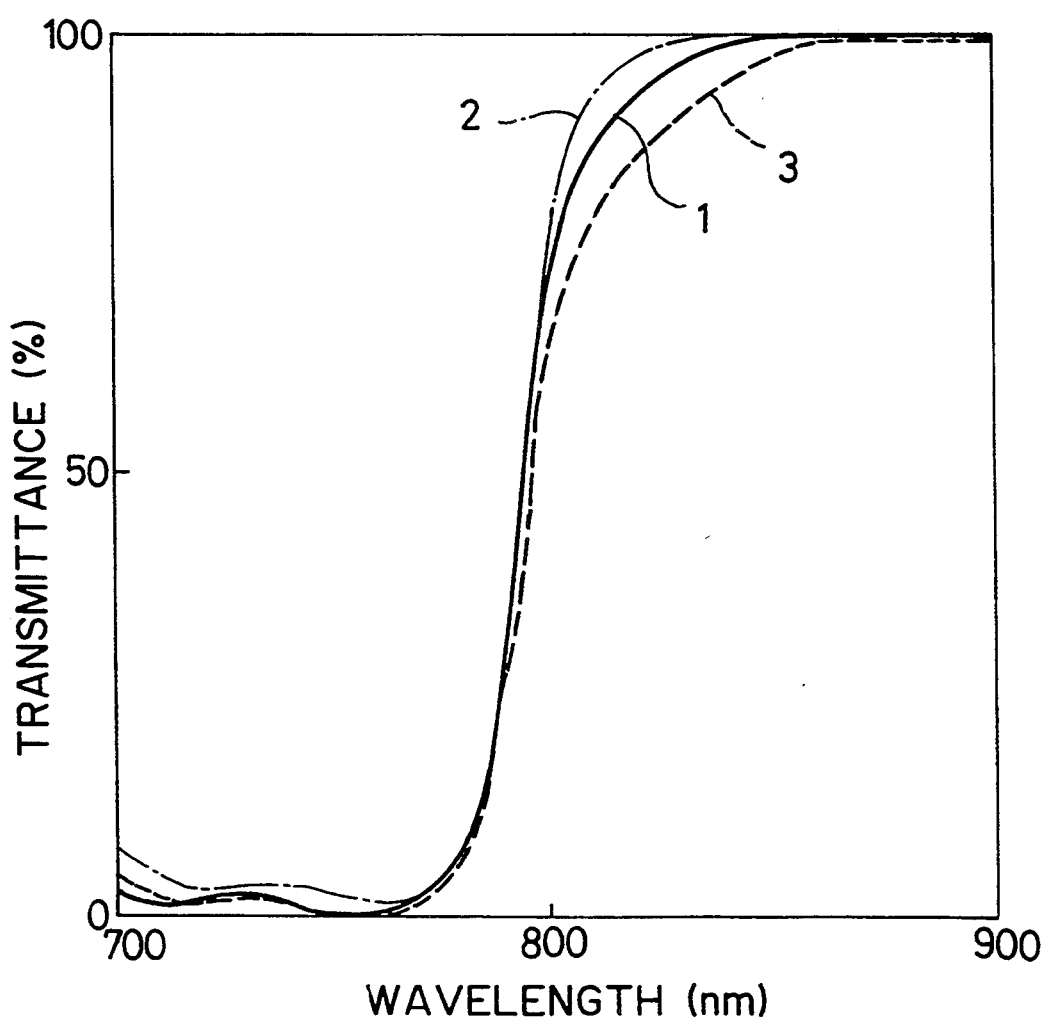

HALOGENATED ANTHRAQUINONE AND THEIR USE AS NEAR INFRARED RAYS ABSORBING OPTICAL FILTERS

BACKGROUND OF THE INVENTION

(1) Field of the Invention

The present invention relates to an optical filter for absorbing near infrared rays and more particularly to a high-purity green anthraquinone which has an absorption band which rapidly terminates in a limited wavelength range in the near infrared region above 700 nm.

(2) Description of the Prior Art

In recent years, various electric devices and measuring equipment have the inclination of diversification and many functions together with the development of electronic technique. In such circumstance, colorants which have an absorption band in the near infrared region are extended in use such as near infrared rays absorbing filters for sensors, sunglasses, protective glasses and optical recording media. Particularly, in case of optical filters for the sensors or the like consisted of this kind of colorant, there is an increasing demand which do not absorb near infrared rays or laser beams in a certain wavelength range but which absorb and cut out rays in another certain wavelength range.

In order to use colorants consisted in such optical filters, fairly high purity is required. However conventional near infrared rays absorbing colorants have low purity and inadequate absorption characteristics and thus can scarecely be used. Particularly in case of a 1,4,5,8-tetraanilidoanthraquinone, the allowable limit of its transmittance in the vicinity of 860 nm is at a level of about 95 to about 96% (a concentration of the dissolved colorant at the time of the transmittance measurement is 4 mg per 100 ml of chloroform). If its transmittance is below this level, the transmission of semiconductor laser beams is hindered noticeably, and therefore it is difficult to use such a colorant as a near infrared rays absorbing filter for measuring equipment and the like where particularly high accuracy is required.

SUMMARY OF THE INVENTION

The present invention is based on the discovery that 1,4,5,8-tetraanilidoanthraquinones which have at least one of four anilido benzene rings bearing a halogen atom have light absorption characteristics suitable for use as near infrared rays absorbing filters, and according to the present invention, the above-mentioned problems can be solved. In a composition aspect this invention relates to a 1,4,5,8-tetraanilidoanthraquinone which is a selective optical filter in the near infrared region and at least one of whose anilido benzene rings bears a halogen atom, preferably in pure form. In a preferred composition aspect, this invention relates to such anthraquinones in high-purity form especially those represented by the formula (I)

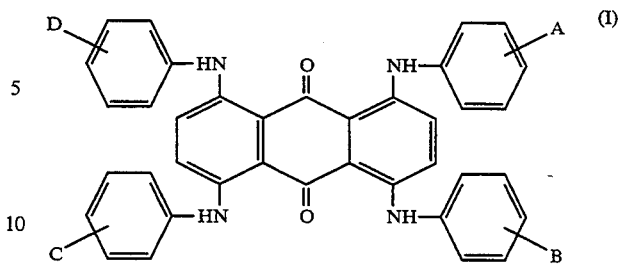

wherein A, B, C and D are a hydrogen atom, a halogen atom, lower alkyl, cycloalkyl, lower alkoxy, trifluoromethyl, phenoxy or hydroxyl, at least one thereof being a halogen atom.

Also the present invention relates to a method for preparing an anthraquinone which comprises the step of reacting 1,4,5,8-tetrachloroanthraquinone with a halogenated aniline, in the presence of an amount of base effective to react with the ionic halogen thus produced.

BRIEF DESCRIPTION OF THE DRAWING

FIG. 1 is a graph illustrating transmittance to wavelength of a solution in chloroform of the compounds of Examples 1 and 3 and Comparative Example 1, in which carves 1, 2 and 3 are the absorption curves of the compounds of Example 1, Example 3 and Comparative Example i respectively.

DESCRIPTION OF THE PREFERRED EMBODIMENT

In the anthraquinone of present invention, at least one of four anilido benzene rings is substituted by a halogen atom such as chlorine, fluorine and bromine, which preferably is in the p-position. The anthraquinone bearing a halogen atom realizes a wave shape of the light absorption of the absorption curves of these compounds render them very suitable for near infrared rays absorbing filters. That is, the anthraquinone bearing a halogen atom can mostly absorb the light in the wavelength range of 700 to 800 nm and realize the transmittance curve which is steeper slope in vicinity of 800 nm than one of other anthraquinone bearing no halogen atom. They also possess high transmittance in the 820 to 830 nm and higher wavelength range.

With regard to the substitutive position of the halogen atom and any other substituents on the anilido benzene rings of the anthraquinone, the p-position is preferred. Substitution at the o-position and m-position generally is not desired for an anthraquinone for near infrared rays absorbing optical filter because of the short wavelength shift which results from the steric hindrance which sometimes is created by such substituents.

Examples of the substituents other than the halogen atom which may be present on the anilido benzene rings preferably in the p-position include lower alkyl groups of 1 to 4 carbon atoms such as methyl, ethyl, propyl, isopropyl, butyl and isobutyl; cycloalkyl groups such as cyclohexyl and cyclopentyl; lower alkoxy groups such as methoxy, ethoxy, propoxy, isopropoxy, butoxy and isobutoxy; and trifluoromethyl, phenoxy and hydroxyl.

The anthraquinone represented by the formula (I) of the present invention are preferably prepared by reacting pure, i.e., of at least 95% and more preferably at least 99% purity, 1,4,5,8-tetrachloroanthraquinone, e.g., recrystallized from a solvent such as monochlorobenzene, dichlorobenzene, nitrobenzene or the like, with aniline derivatives represented by the formula (V), (VI), (VII) and (VIII)

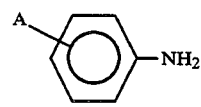

(V)

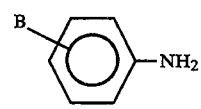

(VI)

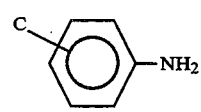

(VII)

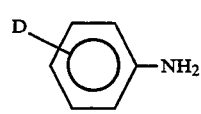

(VIII)

wherein the values of A, B, C and D correspond to those of formula (I), in the molar ratio of the anthraquinone to the aniline derivatives of formulae (V) to (VIII) employed in the reaction of at least 1:4, in the presence of the catalytically effective amount of copper ions, a salt of an aliphatic carboxylic acid and a benzyl alcohol derivative which may bear any substituent.

Examples of the salt of an aliphatic carboxylic acid which are used in the preparation of a halogenated 1,4,5,8-tetraanilidoanthraquinone according to the present invention, to neutralize the hydrogen halide produced in the reaction, include alkali metal salts of lower fatty acids, sodium formate, sodium acetate, potassium acetate and potassium propionate of these, potassium acetate is particularly preferable. The molar amount of the salt of an aliphatic carboxylic acid used is 1 to 10 times, preferably 2 to 5 times that of the 1,4,5,8-tetrachloroanthraquinone.

The reaction is preferable conducted in the presence of a benzyl alcohol derivative. The benzyl alcohol derivative act as activating agents for copper ions Examples of the benzyl alcohol derivative which can be used in the preparation of the halogenated 1,4,5,8-tetraanilidoanthraquinones include benzyl alcohol, p-chrolobenzyl alcohol, p-methylbenzyl alcohol and 2,4-dimethylbenzyl alcohol. The molar amount of the benzyl alcohol delivative used can vary widely, e.g., from 0.01 to 30 times, preferably one to two times that of the 1,4,5,8-tetrachloroanthraquinone.

The copper ions used as the catalyst can be supplied from any source, e.g., a copper salt of any organic or inorganic acid which forms copper ions in the reaction mixture, they are preferably supplied by copper sulfate. The molar amount of the source of the copper ions used can vary widely but suitably is 0.1 to one times that of 1,4,5,8-tetrachloroanthraquinone.

In the preparation of an anthraquinone according to the present invention, the aniline derivatives formulae (V) to (VII) are reacted with 1,4,5,8-tetrachloroanthraquinone in a molar ratio of the former to the latter of at least 4: 1.

They preferably are reacted with each other with stirring in the presence of the above-mentioned copper ions, salt of an aliphatic acid and benzyl alcohol derivative using the aniline derivatives as the solvent or a separate solvent such as ethyl cellosolve or the like. The usual amount of solvent employed 15 to 20 times the molar amount of anthraquinone.

The reaction is conducted at an elevated temperature, e.g., 80° to 170° C., preferably 100° to 150° C. When the reaction temperature is higher than 170° C., the desired product is liable to decompose and when it is lower than 80° C., unreacted starting materials tend to remain. A reaction period of 5 to 10 hours is usually enough for the reaction to go to completion.

The thus obtained halogenated 1,4,5,8-tetraanilidoanthraquinone can be isolated from the reaction product in any conventional manner, e.g., precipitation or fractional crystallization by cooling and/or dilution with a liquid in which the desired product is at most sparingly soluble. Because high, i.e., of at least 95% and preferably of at least 99% purity is preferred, the thus obtained product is further purified, e.g., by crystallization from pyridine, thereby preparing the purified product.

The present invention is described in further detail through the following examples.

In general, laser beams used for the near infrared rays absorbing filters have a wavelength of 830 nm or more, but the wavelength depends upon use applications. In the examples described following, the most usual wavelength of about 860 nm was used to measure the transmittance of compounds represented by the formula (I), and the estimation was made by comparing absorption wave shapes.

EXAMPLE 1

A mixture of 10.87 parts of 99%-purity 1,4,5,8-tetrachloroanthraquinone recrystallized from chlorobenzene, 27.2 parts of p-toluidine, 31.3 parts of p-chloroaniline, 13.4 parts of potasssium acetate, 1.24 parts of copper sulfate and 3.41 parts of benzyl alcohol was heated 130° C. under a nitrogen gas flow and the reaction mixture was then maintained at this temperature for 6.5 hours. Afterward, the reaction mixture was cooled to 70° C. and was then poured into 217 parts of ethanol, followed by filtration, ethanol washing, water washing and drying. The resultant crude product was then subjected to recrystallization from pyridine, thereby obtaining 14.2 parts of desired 1-(p-chloroanilido)-4,5,8-tris(p-methylanilido)anthraquinone (yield=70%) in high purity. By the use of a high-speed liquid chromatography (made by Shimadzu Seisakusho Ltd., SHIMPACK CLC-ODS column, acetonitrile development, detection at 254 nm), it was confirmed that the purity of the product was 99.5%. In addition, the transmittance at 860 nm of the product in chloroform was 99% (product/chloroform=4 mg/100 ml).

Curve 1 of FIG. 1 denotes the transmittance of the product obtained in Example 1. According to curve 1, the product had absorption bands with keen sensitivity in the near infrared range and allowed most of laser beams in the wave range of 840 to 880 nm to be transmitted therethrough, which means that the product was a good near infrared filter.

EXAMPLE 2

The same procedure as in Example 1 was repeated with the exception that the p-toluidine was replaced with 38.1 parts of p-n-butylaniline, so that 12.4 parts of desired 1-(p-chloroanilido)-4,5,8-tris(p-n-butylanilido)anthraquinone was obtained (yield=65%).

It was determined by a high-speed liquid chromatography that the purity of the product was 99.5%. Furthermore, the transmittance of the product in chloroform at 860 nm was 99.2% (product/chloroform=4 mg/100 ml).

The transmittance curve of the product was nearly identical with that of Example 1, which confirmed that the product was a good near infrared filter.

EXAMPLE 3

A mixture of 10.87 parts of 99%-purity 1,4,5,8-tetrachloroanthraquinone recrystallized from chlorobenzene, 62.2 parts of p-chloroaniline, 13.4 parts of potassium acetate, 1.24 parts of copper sulfate and 3.41 parts of benzyl alcohol was heated to 130° C. under a nitrogen gas flow and the reaction mixture was then maintained at this temperature for 4 hours. Afterward, the reaction mixture was cooled to room temperature, and 40.2 parts of p-toluidine was added thereto and reaction was further performed at a temperature of 130° C. for 3 hours. Afterward, the mixture was then poured into 217 parts of ethanol, followed by filtration, ethanol washing, water washing and drying. The resultant crude product was then twice subjected to recrystallization from pyridine, thereby obtaining 12.0 parts of desired 1,4-bis(p-chloroanilido)-5,8-bis(p-methylanilido)anthraquinone (yield =57.3%). By the use of a high-speed liquid chromatography, it was confirmed that the purity of the product was 99.0%. In addition, the transmittance at 860 nm of the product in chloroform was 99.6% (product/chloroform=4 mg/100 ml).

Curve 2 of FIG. 1 denotes the transmittance of the product obtained in Example 3. According to curve 2, the product had absorption bands with keen sensitivity in the near infrared range and allowed most of laser beams in the wave range of 840 to 880 nm to be transmitted therethrough, which means that the product was a good near infrared filter.

EXAMPLES 4 to 13

The same procedure as in Example 1 or 3 was repeated to synthesize the compounds shown in Table 1, and yield, purity and transmittance at 860 nm of each product were then measured. The respective substituents A, B, C and D in the table correspond to those of formula (I).

Curves of transmittance indicated that most of the laser beams were transmitted by the products and that the latter were good near infrared filters.

COMPARATIVE EXAMPLE 1

A mixture of 10.87 parts of 99%-purity 1,4,5,8-tetrachloroanthraquinone recrystallized from chlorobenzene, 54.35 parts of p-toluidine, 13.4 parts of potassium acetate, 1.24 parts of copper sulfate and 3.41 parts of benzyl alcohol was heated to 130° C. under a nitrogen gas flow and the reaction mixture was then maintained at this temperature for 6.5 hours. Afterward, the reaction mixture was cooled to 70° C. and was then poured into 217 parts of ethanol, followed by filtration, ethanol washing, water washing and drying.

The resultant crude product was then recrystallized from pyridine, thereby obtaining 13.8 parts of desired 1,4,5,8-tetrakis(p-methylanilido)anthraquinone (yield=70%). By the use of a high-speed liquid chromatography (made by Shimadzu Seisakusho Ltd., SHIM-PACK CLC-ODS column, acetonitrile development, detection at 254 nm), the purity of the product was determined to be 99.2%. In addition, the transmittance of the product at 860 nm in chloroform was 99% (product/chloroform=4 mg/100 ml).

Curve 3 of FIG. 1 denotes the transmittance of the product obtained in Comparative Example 1. It can be seen from curve 3, the transmission of the product is poor in a 800–830 wavelength range.

TABLE 1

| Example No. | Substituent of Formula (I) | | | | Yield (%) | Purity (%) | Transmittance* (%) |
| --- | --- | --- | --- | --- | --- | --- | --- |
| | A | B | C | D | | | |
| 4 | p-Cl | —H | —H | —H | 75 | 99.2 | 98.8 |
| 5 | p-Cl | p-OCH3 | p-OCH3 | p-OCH3 | 70 | 99.0 | 98.9 |
| 6 | p-Cl | p-Cl | p-Cl | p-Cl | 80 | 99.8 | 100 |
| 7 | p-Cl | p-cyclo-hexane | p-cyclo-hexane | p-cyclo-hexane | 75 | 99.5 | 99.2 |
| 8 | p-Cl | p-Cl | p-OH | p-OH | 55 | 98.9 | 98.5 |
| 9 | p-Cl | p-CH3 | p-cyclo-hexane | p-CH3 | 50 | 99.0 | 99.5 |
| 10 | p-F | p-CH3 | p-CH3 | p-CH3 | 63 | 99.0 | 99.2 |
| 11 | m-Br | p-CH3 | p-CH3 | p-CH3 | 71 | 99.2 | 98.2 |
| 12 | m-F | p-OCH3 | p-OCH3 | p-OCH3 | 67 | 99.3 | 99.6 |
| 13 | p-Br | p-cyclo-hexane | p-cyclo-hexane | p-CH3 | 52 | 99.2 | 99.1 |

*The transmittance was measured at 860 nm in chloroform.

What is claimed is:

1. A method for preparing a high purity an anthraquinone represented by the formula

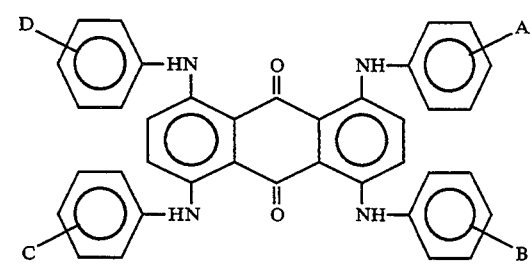

wherein A, B, C and D are a hydrogen atom, a halogen atom, lower alkyl, cycloalkyl, lower alkoxy, trifluoromethyl, phenoxy or hydroxyl, at least one thereof being a halogen atom, which comprises the steps of reacting 1,4,5,8-tetrachloroanthraquinone of at least 95% purity with a monohalogenated aniline or a mixture of at least one molar equivalent thereof and another aniline of the formula

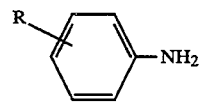

wherein R is a hydrogen atom, lower alkyl, cycloalkyl, lower alkoxy, trifluoromethyl, phenoxy or hydroxyl, in the presence of a salt of an aliphatic carboxylic acid, a benzyl alcohol derivative and an amount of base effective to react with the ionic halogen thus produced, at a temperature 80° to 170° C. for a period of time sufficient for the reaction to go to completion; and isolating the desired reaction product from the reaction mixture by at least one of cooling and dilution with a liquid in which the desired reaction product is at most sparingly soluble.

2. A method according to claim 1, wherein R is a hydrogen atom, the molar ratio of the anthraquinone to the total anilines is at least 1:4, and the reaction is conducted in the presence of a catalytically effective amount of copper ions.

3. A method according to claim 2 wherein the molar amount of the salt of an aliphatic carboxylic acid employed therein is 1 to 10 times that of the 1,4,5,8-tetrachloroanthraquinone.

4. A method according to claim 3 wherein the salt is potassium acetate.

5. A method according to claim 2 wherein the molar amount of the benzyl alcohol derivative employed therein is 0.01 to 30 times that of the 1,4,5,8-tetrachloroanthraquinone.

6. A method according to claim 5 wherein the benzyl alcohol derivative is benzyl alcohol.

7. A method according to claim 2 wherein the copper ions are supplied by copper sulfate.

8. A method according to claim 7 wherein the molar amount of copper sulfate employed therein is 0.1 to 1 times that of the 1,4,5,8-tetrachloroanthraquinone.

9. A method according to claim 7 wherein the reaction is performed in the presence of benzyl alcohol, potassium acetate and copper sulfate.

10. A method according to claim 7 wherein the reaction solvent is the aniline.

11. A method according to claim 2 wherein the reaction solvent is ethyl cellosolve, employed in a molar amount 15 to 20 times that of the 1,4,5,8-tetrachloroanthraquinone.

12. A method according to claim 2 wherein the halogenated aniline is p-chloroaniline; wherein the molar amount of the salt of an aliphatic carboxylic acid employed therein is 1 to 10 times that of the 1,4,5,8-tetrachloroanthraquinone; wherein the reaction is performed in the presence of benzyl alcohol, potassium acetate and copper sulfate; wherein the reaction solvent is aniline or ethylcellusolve, employed in a molar amount 15 to 20 times that of the 1,4,5,8-tetrachloroanthraquinone.

* * * * *